United States Patent
Allidieres et al.

(10) Patent No.: US 8,517,062 B2
(45) Date of Patent: Aug. 27, 2013

(54) METHOD FOR FILLING A PRESSURIZED GAS CONTAINER

(75) Inventors: Laurent Allidieres, Saint Martin d'Uriage (FR); Thomas Charbonneau, Westmount (CA); Sebastian Sequeira, Vourey (FR); Thomas Vinard, Sassenage (FR)

(73) Assignee: L'Air Liquide Societe Anonyme pour l'Etude et l'Exploitation des Procedes Georges Claude, Paris (FR)

( * ) Notice: Subject to any disclaimer, the term of this patent is extended or adjusted under 35 U.S.C. 154(b) by 737 days.

(21) Appl. No.: 12/677,237

(22) PCT Filed: Aug. 27, 2008

(86) PCT No.: PCT/FR2008/051533
§ 371 (c)(1),
(2), (4) Date: Jun. 21, 2010

(87) PCT Pub. No.: WO2009/034283
PCT Pub. Date: Mar. 19, 2009

(65) Prior Publication Data
US 2010/0294393 A1  Nov. 25, 2010

(30) Foreign Application Priority Data

Sep. 10, 2007  (FR) .................................. 07 57456

(51) Int. Cl.
*B65B 31/00* (2006.01)
*F17C 5/06* (2006.01)

(52) U.S. Cl.
CPC ........................ *F17C 5/06* (2013.01)
USPC ................. 141/4; 141/95; 141/197

(58) Field of Classification Search
USPC ......................... 141/4, 95, 197; 62/45.1–54.3
See application file for complete search history.

(56) References Cited

U.S. PATENT DOCUMENTS 6,237,347 B1 *  5/2001  Rigby et al. .................. 62/48.1
6,360,793 B1 *  3/2002  Sugano et al. ................ 141/197

(Continued)

FOREIGN PATENT DOCUMENTS

EP   1 772 663    4/2007
EP   1 818 597    8/2007

OTHER PUBLICATIONS

International Search Report for PCT/FR2008/051533, Mar. 19, 2009.

(Continued)

*Primary Examiner* — Timothy L Maust
(74) *Attorney, Agent, or Firm* — Christopher J. Cronin

(57) ABSTRACT

A method for filling a gas tank at a pressure P2 from at least one gas source at a pressure Pi, P1 being higher than V2, said container and said at least one gas source being connected by a duct allowing the passage of gas from one to the other, the filling being carried out at a flow rate which is, at the end of the filling, lower than the initial flow rate, wherein said method comprises several successive filling steps 1 to i, each of the steps being carried out with a filling flow rate D1 to Di for a time t1 to ti, i being an integer higher than or equal to 2, the flow rate of a step i-1 being higher than the flow rate of the step i,; characterized in that the successive filling steps 1 to i are adapted for producing a controlled heating of the container that maximizes the heat dispersal in said container without increasing the temperature inside the container beyond the maximum accepted temperature for the container, and in that the sum of ti is between 1 and 7 minutes, preferably between 1 min 30 sec and 5 minutes, and more preferably between 2 and 4 minutes.

18 Claims, 5 Drawing Sheets

(56) References Cited

U.S. PATENT DOCUMENTS

| | | | |
|---|---|---|---|
| 6,619,336 | B2 | 9/2003 | Cohen et al. |
| 6,786,245 | B1 | 9/2004 | Eichelberger et al. |
| 7,128,103 | B2 * | 10/2006 | Mitlitsky et al. ............... 141/248 |
| 7,152,637 | B2 * | 12/2006 | Hoke, Jr. ....................... 141/192 |
| 7,328,726 | B2 * | 2/2008 | Cohen et al. ....................... 141/9 |
| 7,568,507 | B2 * | 8/2009 | Farese et al. ..................... 141/95 |
| 2003/0070724 | A1 | 4/2003 | Shock |
| 2005/0178463 | A1 | 8/2005 | Kountz et al. |
| 2007/0125441 | A1 | 6/2007 | Farese et al. |
| 2009/0107577 | A1 | 4/2009 | Allidieres et al. |

OTHER PUBLICATIONS

Barral, K., et al., "Thermal effects related to H2 fast filling in high pressure vessels depending on vessels types and filling procedures: modeling, trials and studies," European Hydrogen Energy Conferences EHEC, Grenoble (France), Sep. 2003.

Pregassame, S., et al., "Operation feedback of hydrogen filling station," Hydrogen Fuel Cells 2004 Conference and Trade Show, Toronto (Canada), Sep. 2004.

Barral, K., et al., "Thermal effects of fast filling hydrogen compression in refueling stations," 15th World Hydrogen Energy Conference, Yokohama (Japan), Jun. 2004.

* cited by examiner

| % TIME | % MASS TRANSFERRED LOWER LIMIT | % MASS TRANSFERRED UPPER LIMIT |
|---|---|---|
| 0% | 0.0% | 0.0% |
| 10% | 12.0% | 35.0% |
| 20% | 25.0% | 48.0% |
| 30% | 37.5% | 58.0% |
| 40% | 48.0% | 67.0% |
| 50% | 58.0% | 75.0% |
| 60% | 68.0% | 83.0% |
| 70% | 75.0% | 88.0% |
| 80% | 82.5% | 92.0% |
| 90% | 91.0% | 96.0% |
| 100% | 100.0% | 100.0% |

FIG. 5

METHOD FOR FILLING A PRESSURIZED GAS CONTAINER

CROSS-REFERENCE TO RELATED APPLICATIONS

This application is a §371 of International PCT Application PCT/FR2008/051533, filed Aug. 27, 2008.

BACKGROUND

The present invention relates to the filling of a pressurized gas container. In particular, the invention relates to the filling of the gas tank of vehicles operating with a fuel cell or those with an internal combustion engine operating with hydrogen.

Document EP 1 818 597 describes a filling method consisting in using two successive filling steps (the second filling step having a lower filling rate than the filling rate of the first step). This filling method is designed to improve the reliability of the measurements (for example the pressure and temperature measurements) and the precision of the amount of gas transferred during the filling. This method, although it does allow a relatively precise measurement of the transferred mass to be obtained, is, however, not very satisfactory for improving the filling speed.

The hydrogen tanks or containers on board a vehicle must be filled in at most a few minutes, preferably in less than five minutes, so that filling is compatible with the daily use of the vehicle by the user, i.e. so that the vehicle is out of service for the minimum amount of time.

Rapid pressurization of tanks causes the gas to heat up to high temperatures, which is liable to damage the walls of the tank. Thus, it is therefore very important not to exceed this temperature limit value given by the tank manufacturer.

The gas heats up because, on the one hand, of the Joule-Thomson effect, i.e. heating caused by the pressure difference between the hydrogen source and the tank, and, on the other hand, because of the compression of the gas in the receiving tank. Joule-Thomson heating occurs along the line and the accessories, especially the valves, hoses and pipes, comprising the filling circuit. As regards the heating by compression of the gas, this is due to introduction of enthalpy into the tank via the supply gas: by being compressed, the gas inside the tank rises in temperature. The combined effect of these phenomena is the release of heat.

Simultaneously with this heating there is heat dissipation from the gas to the walls of its tank and then to the environment of the tank. This dissipation depends on the thermal properties of the gas, on the tank, on the ambient temperature and on the initial filling conditions. The heating effect will be more pronounced or less pronounced than that of the dissipation effect depending on how the flow rate used during filling varies.

There are mathematical models for calculating the variation in the conditions of the gas inside the tank during filling as a function of certain parameters (such as the initial conditions, the environment and characteristics of the tank) and also the operational variables of the filling (conditions of the supply gas throughout the length of the filling operation and the flow rate during filling).

The following three articles give for example detailed information on mathematical models of this type:

[1] K. Barral, E. Werlen, P. Pisot and P. Renault, "*Thermal effects related to H2 fast filling in high pressure vessels depending on vessels types and filling procedures: modeling, trials and studies*", European Hydrogen Energy Conference EHEC, Grenoble (France), September 2003;

[2] S. Pregassame, K. Barral, L. Allidieres, T. Charbonneau and Y. Lacombe, "*Operation feedback of hydrogen filling station*", Hydrogen and Fuel Cells 2004 Conference and Trade Show (Toronto, September 2004);

[3] K. Barral, S. Pregassame and P. Renault, "*Thermal effects of fast filling hydrogen compression in refueling stations*", 15th World Hydrogen Energy Conference, Yokohama (Japan), June 2004.

Such models can be used for mathematically formulating optimization problems.

SUMMARY OF THE INVENTION

In particular, the inventors propose especially to determine the filling rate curve as a function of time so that the total filling time is minimized, knowing the characteristics of the tank, the ambient conditions (for example the ambient temperature), the source gas conditions (for example pressure and temperature) and any constraints (for example, the maximum wall temperature of the tank and the maximum fill rate).

The present inventors were able to determine that, when a given tank is filled from at least one pressurized gas source, all other conditions being constant, there is an optimum filling rate curve such that the time needed for filling a given mass is minimized. Surprisingly, this optimum curve corresponds to maximization of the heat dissipation.

The present invention may relate to the form and the application of this optimum rate curve. During their research, the inventors were able to determine that, depending on the optimum filling rate curve, the rates decrease over the course of time and that it is possible to approach this optimum rate curve by a succession of straight lines of decreasing slopes, i.e. by a series of various decreasing rates. In fact, the inventors have found that the filling time can be reduced when the filling rate is higher at the start of filling than at the end of filling. By means of a high flow rate at the start of filling and then lower flow rates, the heating can be controlled and the energy dissipation maximized. More particularly, the inventors have, to their credit, developed a novel method of filling containers with pressurized gas that comprises at least two filling steps with different flow rates.

It is important to note that a high rate at the start of filling and a low rate toward the end of filling are achieved spontaneously when there is a single gas source, for example a pressurized tank (as the source empties, its pressure reduces). However, to limit the heating and for economic reasons, the gas source is formed in practice from a number of sources at different pressures. This situation requires the filling to be actively controlled so as to fill with the desired flow rate variation.

A filling curve may be schematically represented in an XY plane in which the X axis is the filling time, expressed as a percentage of the total time, and the Y axis is the mass of gas transferred, expressed as a percentage of the desired total change in mass. Because the volume of the receiving tank is constant, the density in the filled tank may be used as measure instead of the mass. Because the temperature variations are relatively smaller than the pressure variations, it is important to point out that this curve does not differ greatly from that of the variation in pressure as a function of time.

The invention therefore relates to a method of filling a container with gas to a pressure $P_2$ from at least one gas source at a pressure $P_1$, $P_1$ being greater than $P_2$, said container and said at least one gas source being connected via a line enabling the gas to pass from one to the other, characterized in that the filling takes place at a flow rate which, at the end of filling, is lower than the initial flow rate.

More particularly, the invention relates to a filling method as described above, characterized in that it comprises several successive filling steps 1 to i, each of the steps being carried out with a filling flow rate D1 to Di for a time t1 to ti, i being an integer equal to or greater than 2, the flow rate of step i-1 being higher than the flow rate of step i, and the sum of the $t_i$s being between 1 and 7 minutes, preferably between 1 minute 30 seconds and 5 minutes and more preferably between 2 and 4 minutes. In one advantageous embodiment, the container is filled in less than 3 minutes.

FIG. 4 illustrates such an example of an XY plot for types of tanks currently used for rapid filling. Two curves, "lower limit" and "upper limit" respectively, delimit the optimum filling zone.

FIG. 5 is a table detailing transferred mass values (as a function of time) associated with these limits. As a reference, FIG. 4 also shows the curve X=Y plotted as the dot-dash line. This X=Y curve is very close to that corresponding to filling with a constant pressure ramp.

The dotted curve shows an example of filling in which the variation is optimum and obtained approximately by applying two rates: a first, high rate (40% of the mass is transferred in the first 20% of the total filling time) and a second, lower rate.

The expression "pressurized gas container" is understood in the invention to mean any gas tank, especially of the tanker type, mobile tank and, most particularly, a vehicle tank, requiring to be rapidly filled and enabling the gas to be maintained under pressure. In one particular embodiment of the invention, the expression "pressurized gas container" is understood to mean a number of tanks, such as especially several gas bottles placed in parallel, whether being of identical or different capacities.

The expression "pressurized gas source" in the invention is understood to mean any source available to a person skilled in the art, of the following types: gas pipeline, refinery tank, tanker truck, hydride-based hydrogen storage tank, compressor delivery circuit, or service station tank, which can constitute a gas supply source for a pressurized gas container according to the invention. In one particular embodiment of the invention, the expression "pressurized gas source" is understood to mean a number of pressurized gas sources, such as in particular a series of tanks under increasing pressures, or else tanks pressurized by one or more compressors.

In other words, the expression "pressurized gas container" denotes any container that can be filled with gas and the expression "pressurized gas source" denotes any gas source that can fill a container.

The expression "line enabling the gas to pass from one to the other" is understood to mean any type of line used by a person skilled in the art for transporting the gas from a gas source to a container. In particular, this covers lines capable of withstanding high pressures.

The expression "filling rate" is understood in the invention to mean an amount of gas filling the container per unit time.

According to the invention, the container is filled at decreasing rates, i.e. the pressurized gas container is filled at a higher rate at the start of filling than at the end of filling: D1>D2>D3>D4>D5 . . . >Di. The first filling step is carried out with a flow rate $D_1$ for a time $t_1$, the second step with a flow rate $D_2$ for a time $t_2$, etc. In other words, the filling rate is high at the start of filling and then decreases thereby preventing too large an increase in the pressure of the gas inside the pressurized container and an increase in the temperature of the gas inside said container above the maximum temperature tolerated by the tank. In addition, this filling method by flow rate regulation has the advantage of being easy to implement and of being inexpensive. Preferably, the filling method as described above comprises 2 to 20 successive filling steps with decreasing filling rates $D_1$ to $D_{20}$ for times $t_1$ to $t_{20}$, the sum of the times $t_1$ to $t_{20}$ being between 1 and 7 minutes, preferably between 1 minute 30 seconds and 5 minutes and more preferably between 2 and 4 minutes.

Even more preferably, the filling method as described above comprises 2, 3, 4 or 5 successive filling steps with decreasing filling rates $D_1$, $D_2$, $D_3$, $D_4$ and $D_5$ for times $t_1$, $t_2$, $t_3$, $t_4$ and $t_5$, the sum of the times $t_1+t_2+t_3+t_4+t_5$ being between 1 and 7 minutes, preferably between 1 minute 30 seconds and 5 minutes and more preferably between 2 and 4 minutes.

In one particular embodiment, the filling method as described above comprises only two successive filling steps, the first filling step of which with a flow rate $D_1$ for a time $t_1$ and the second filling step with a flow rate $D_2$ for a time $t_2$, where $D_1>D_2$, the sum of the times $t_1+t_2$ being between 1 and 7 minutes, preferably between 1 minute 30 seconds and 5 minutes and more preferably between 2 and 4 minutes.

In another particular embodiment, the filling method as described above comprises three successive filling steps, the first filling step of which with a flow rate $D_1$ for a time $t_1$, the second filling step with a flow rate $D_2$ for a time $t_2$ and the third filling step with a flow rate $D_3$ for a time $t_3$, where $D_1>D_2>D_3$, the sum of the times $t_1+t_2+t_3$ being between 1 and 7 minutes, preferably between 1 minute 30 seconds and 5 minutes and more preferably between 2 and 4 minutes.

In one embodiment of the invention, the filling method as described above is characterized in that the successive filling steps are carried out with successive decreasing flow rates, each having a different rate of decrease.

The succession of different decreasing flow rates as described above makes it possible in practice to approach as close as possible the optimum flow rate curve, i.e. the shortest filling time. Thus, the time $t_i$ of each filling step will be appreciated by a person skilled in the art. The times $t_i$ may be identical but they may also be different.

In one particular embodiment of the invention, the filling method as described above may be associated with a means of cooling the filling installation. Specifically, it is possible to further improve the speed of filling by lowering the temperature of the gas in the pressurized container a little further. Thus, the invention also relates to a process as described above in which all or part of the installation is cooled. In particular, the gas source and/or the container and/or the line connecting the gas source to the container may be cooled. For practical reasons, in one advantageous embodiment, the gas is cooled during filling by means of a heat exchanger located in the filling circuit.

According to the invention, the filling rate may be controlled by any member known to those skilled in the art for regulating a flow rate. In particular, the flow rate may be measured by a Coriolis flowmeter, a pressure difference in a gas flow resistance in the line, or a mass variation over time. Using mathematical models, it is also possible to estimate the flow rate as a function of the values and/or variations in values of other variables of the method that can be easily measured, particularly pressures. Thus, the pressure reduction in a tank or the gas is recorded and/or the pressure increase in the pressurized gas container makes it possible to calculate the transferred amount, this calculation being even more precise if the temperatures are measured. In one embodiment of the method according to the invention, the rate at which said container is filled is regulated using an on/off valve placed on said line enabling the gas to pass.

The expression "on/off valve" is understood in the invention to mean a device for regulating the rate of flow of fluid passing through said line in a discrete manner, characterized in that it comprises only two states, either it is open, that is to say it lets the fluid all pass through it, or it is closed, that is to say it lets no fluid pass through it.

In this embodiment, the flow rate is regulated by successively opening and closing the on/off valve. To obtain a high flow rate, the phases during which the valve is open will be longer than the phases during which it is closed. Conversely, to obtain a lower flow rate, the phases during which the valve is closed will be longer than the phases during which it is open. Moreover, in this embodiment, the opening and closing of the on/off valve may depend on the mean flow rate measurement, on the pressure in the pressurized gas container and/or in the gas source and/or in the line connecting the source to the container. Thus, it is possible to use the instantaneous flow rate measurement, which is calculated in a given time window, also considering the fractions of the time in which the flow rate is zero, so as to obtain a mean flow rate for a particular time window. For example, if this mean flow rate is higher than the desired flow rate, the valve will remain closed for a longer time than when it is open. In particular, the pressure increase in the container may be measured over the course of time and/or the pressure reduction in the gas source may be measured over the course of time. For example, if the pressure increases too much in the container, the filling rate must be reduced and therefore the valve will remain closed for a time longer than when it is open. This regulation may be implemented manually by an operator, but of course it is preferable to use an automated control system, estimating or measuring the amount transferred, the pressure in the gas container, in the gas source and/or in the line connecting the source to the container, and opening or closing the valve depending on whether it is necessary to increase or decrease the filling rate. In this embodiment, the operator applies as setpoint a series of flow rate ramps and the optimum flow rate curve may be approached as closely as possible.

In another embodiment of the method according to the invention, the rate at which said container is filled is regulated using a variable-flow regulating valve placed on said line enabling the gas to pass.

The expression "variable-flow regulating valve" is understood in the invention to mean a device enabling the flow rate of fluid passing through said line to be regulated in an analog manner, characterized in that opening and closing of the valve may be regulated gradually. To obtain a high flow rate, the operator opens the valve completely, and to reduce the flow rate he closes the valve somewhat.

This embodiment may furthermore include a direct measurement of the temperature of the gas inside the pressurized gas container, thereby making it possible to approach the optimum in-line filling rate by keeping the temperature at the maximum value tolerated by the container. In this embodiment, the flow rate is regulated by any member known to those skilled in the art, in particular by a PID (proportional, integral, derivative) regulator of constant or variable action, since the PID regulator may have parameters (proportional, integral or derivative action) that are constant and/or variable so as to compensate for the nonlinearities of the system.

Moreover, in another type of regulation, the variable-flow regulating valve may be controlled using a regulator with predictive action. The term "predictive action" is understood in particular to involve control algorithms based on models, making it possible to predict the behavior of the system and always to apply a suitable flow rate so as to reduce the risk of the maximum temperature being exceeded.

Ideally, it will be preferable to use an even more complete, advanced control system, which optimizes the flow rate as filling proceeds via the use of a mathematical model: the optimum flow rate curve is calculated in particular as a function of the shape and the dimensions of the container and the current information about the conditions of the gas at the inlet, and then the flow rates for following this curve are varied, resulting in the shortest filling time. In practice, it may be difficult to implement such a very fine regulation. For this reason, it is preferable to employ successive flow rate ramps so as to best approach the optimum flow rate curve defined beforehand.

Again, in another embodiment of the method according to the invention, the rate at which said container is filled is regulated using a set of on/off valves having different flow rates placed in parallel and connected to said line enabling the gas to pass, so that one particular flow rate corresponds to one on/off valve and the opening and/or closing of one or other of the valves is controlled according to the desired filling rate.

In this particular embodiment, the line enabling the gas to pass supplies the various on/off valves placed in parallel. Each of the valves provides a specific filling rate, of higher or lower value. Thus, the filling rate will be different depending on which valve is open. Preferably, only one valve is open at a time, but for the purpose of obtaining high flow rates, it is possible to open several valves at the same time so that several filling rates are added in order to obtain a higher final rate corresponding to the sum of the filling rates of each open valve. Thus, according to this particular embodiment, the operator is capable of applying a series of different flow rate ramps decreasing over the course of time, so as to best approach the optimum flow rate curve.

In another embodiment, the filling rate is regulated using the variation in the frequency of the electrical supply for a compressor or using the variation in the frequency of the pneumatic supply for a compressor.

According to yet another particular embodiment of the invention, the rate at which the container is filled is adjusted according to the temperature of the container, which may be measured or estimated by any member known to those skilled in the art.

BRIEF DESCRIPTION OF THE FIGURES

The present invention will be better understood on reading the detailed description of particular embodiments and non-limiting examples, these being given solely for the purpose of illustration.

FIG. 5 shows a table detailing examples of transferred mass values (as a function of time) associated with upper and lower limits delimiting time-optimized filling.

DETAILED DESCRIPTION OF THE INVENTION

Figure 1:
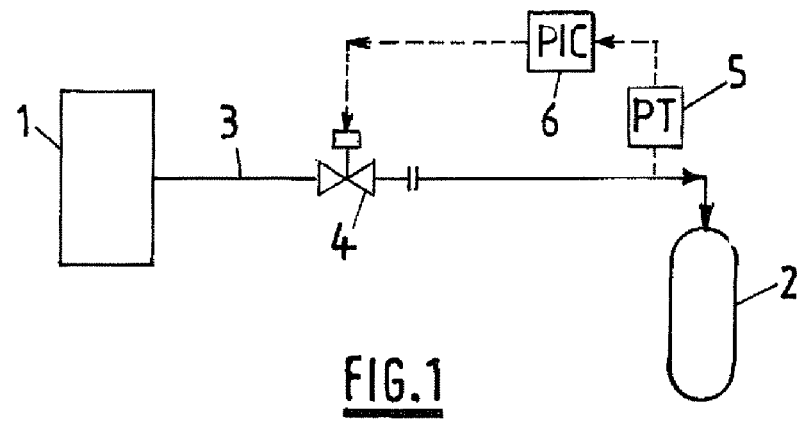
FIGS. 1, 2 and 3 show installations for implementing particular embodiments of the method according to the invention.

FIG. 1 shows an installation for implementing a method of filling a container 2 with gas to a pressure $P_2$ from a gas source 1 at a pressure $P_1$ above $P_2$, said container 2 and said gas source 1 being connected via a line 3 enabling the gas to pass from one to the other. The flow of gas filling the container 2 is regulated using an on/off valve 4 placed on said line 3. The opening and closing of this on/off valve 4 depends on the mean flow rate, likened to an increase in the pressure $P_2$ of the pressurized gas in the container 2, which is estimated by measuring the pressure in the feed line 3 at the inlet of the container 2 using a pressure-transmitting system 5 or PT (pressure transmitter) coupled to a pressure indicator 6 or PIC (pressure indicator controller) which controls the opening and closing of the valve 4.

Figure 2:
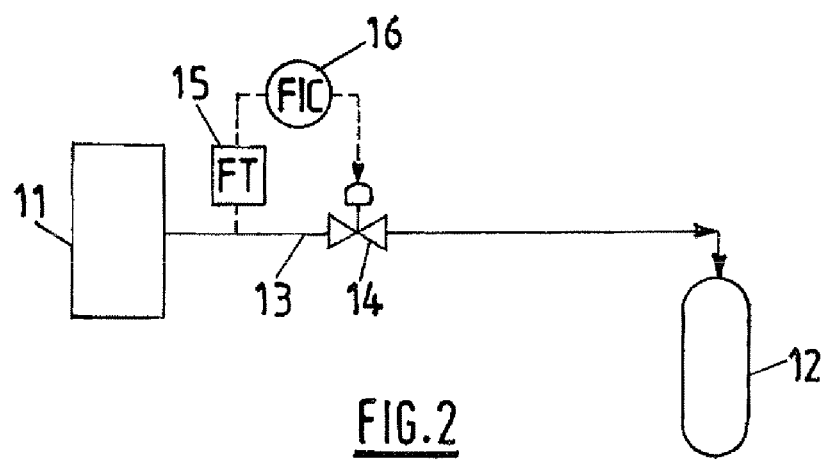

FIG. 2 shows an installation for implementing a method of filling a container 12 with gas to a pressure $P_2$ from a gas source 11 at a pressure $P_1$ above $P_2$, said container 12 and said gas source 11 being connected via a line 13 enabling the gas to pass from one to the other. The flow of gas filling the container 12 is regulated using a variable-flow regulating valve 14 placed in said line enabling the gas to pass. The opening and closing of this regulating valve 14 depends on the rate of gas transfer, which is measured using a flow-transmitting system 15 or FT (flow transmitter) coupled to a flow indicator 16 or FIC (flow indicator controller) which controls the opening and closing of the valve 14.

Figure 3:
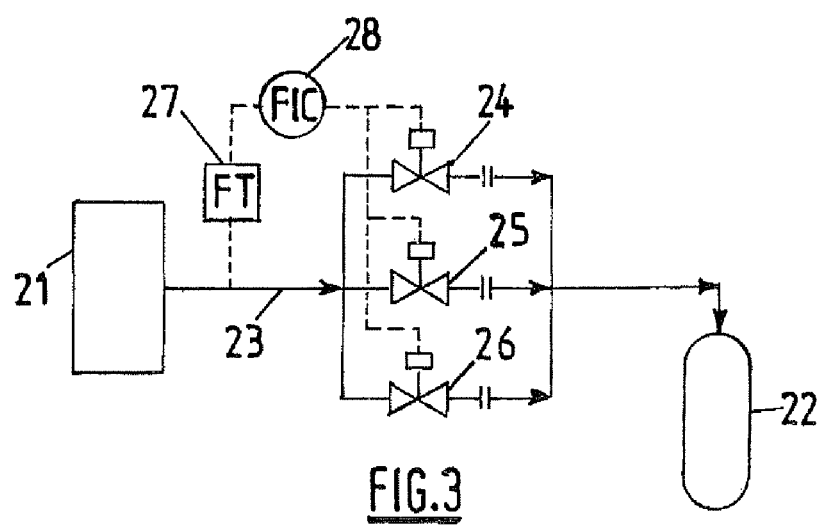
Figure 4:
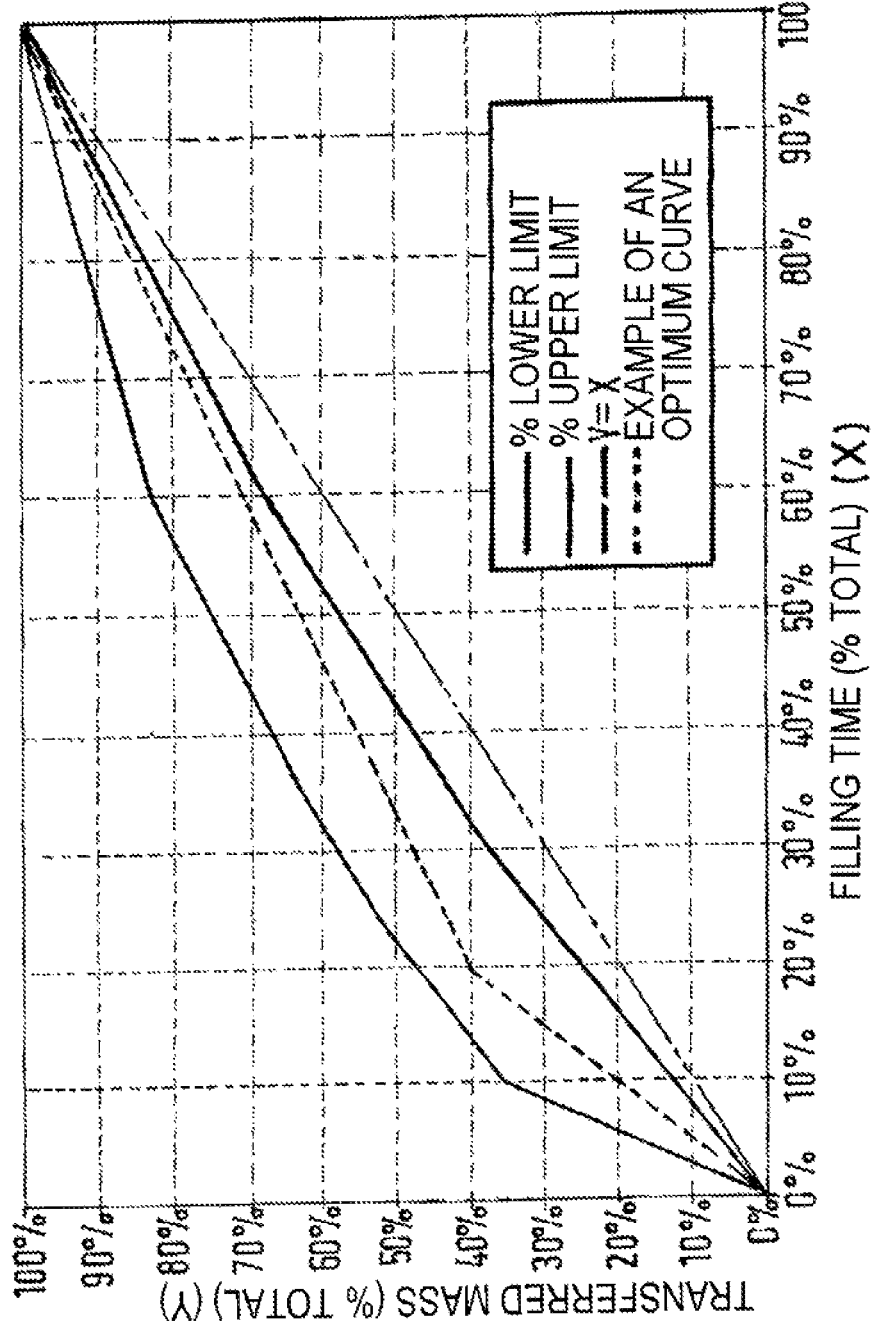
FIG. 4 illustrates an example of time-optimized rapid filling (transferred mass plotted as a function of time).

FIG. 3 shows an installation for implementing a method of filling a container 22 with gas to a pressure $P_2$ from a gas source 21 at a pressure $P_1$ above $P_2$, said container 22 and said gas source 21 being connected via a line 23 enabling the gas to pass from one to the other. The flow of gas filling the container 22 is regulated using a set of three on/off valves 24, 25, 26 having different flow rates which are placed in parallel and connected to said line 23, so that one particular flow rate corresponds to one on/off valve 24, 25, 26 and the opening and/or closing of each valve is controlled according to the filling rate, which is measured using a flow-transmitting system 27 or FT (flow transmitter) coupled to a flow indicator 28 or FIC (flow indicator controller) which controls the opening and closing of the valves 24, 25, 26.

EXAMPLES

Example 1

Filling of a Container with Gas by Successive Filling Steps and Discrete Regulation A 47 liter bottle of type III (made of a composite with an aluminum liner) was filled under pressure with 1.08 kg of hydrogen without exceeding a maximum temperature of 72° C.

To do this, a manifold, maintained at a pressure of 400 bar and a temperature of 25° C., was used as pressurized hydrogen source.

The bottle was filled according to two different protocols.

The first protocol corresponded to conventional filling, consisting in filling at a constant mean flow rate of 5.1 g/s, the flow rate here being likened to the rate of pressure rise (118 bar/min), which is easier to measure, with a linear rise in pressure of the gas in the bottle, using an on/off valve, the opening and closing rate of which varies so as to make the pressure in the bottle rise in a linear fashion thanks to the flow surges. The pressure rise used corresponded to the maximum constant flow rate that can be applied in order to fill the entire bottle with gas without exceeding the maximum temperature of 72° C. By following this protocol, the bottle was filled in 3.1 minutes, the maximum temperature reached in the bottle being 72° C.

The same filling operation was then carried out under different conditions by applying 3 successive flow rates according to the method of the invention. As in the previous case, these flow rates were likened to rates of pressure rise. A first flow rate $D_1$ corresponding to 220 bar/min (10.6 g/s), then a second flow rate corresponding to 150 bar/min (6.8 g/s) and finally a third flow rate corresponding to 80 bar/min (3.2 g/s) were applied. By following this protocol, the pressure in the bottle rose steadily in a linear fashion in intervals thanks to the flow surges, so as to approximate the optimum non-linear filling curve. The maximum temperature was rapidly reached, but maintained throughout the filling. Finally, the bottle was completely filled after only 2.5 minutes.

Figure 6:
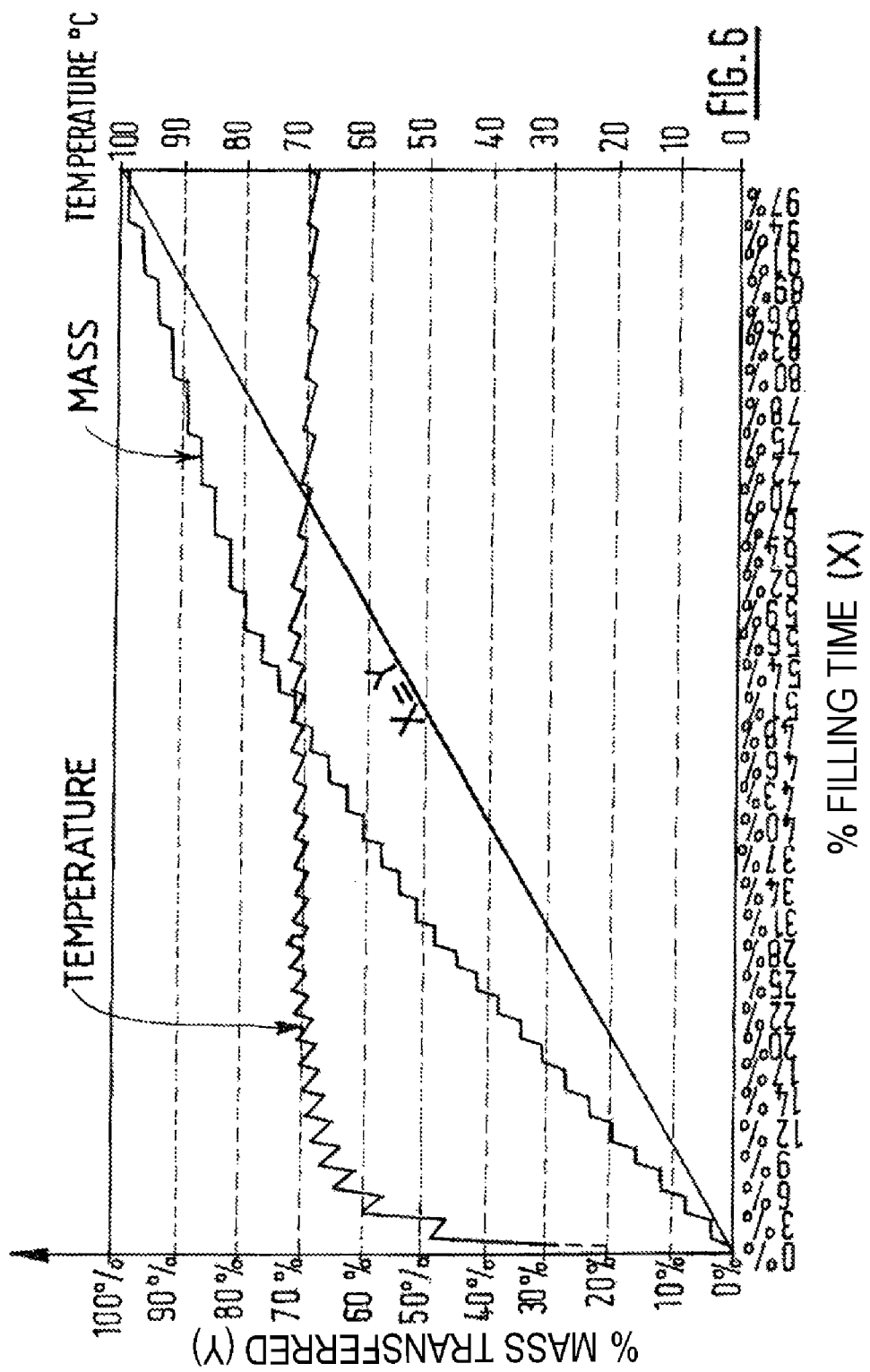
FIGS. 6 and 7 illustrate the variation in the transferred mass and the temperature in the respective two examples of filling according to the invention.

Thus, the saving in time is considerable: the gas is transferred 25% faster than in a conventional method. FIG. 6 shows the variation in the transferred mass and the temperature during the filling in this example.

Example 2

Filling of a Container with Gas by Successive Filling Steps and Analog Regulation A 36 liter bottle of type IV (made of a composite with a polymer liner) was filled under pressure with 1.4 kg of hydrogen without exceeding a maximum temperature of 85° C.

To do this, a manifold, maintained at a pressure of 900 bar and a temperature of −20° C., was used as pressurized hydrogen source.

The bottle was filled according to two different protocols.

The first protocol corresponded to conventional filling, consisting in filling at a constant flow rate of 5.95 g/s with an approximately linear pressure rise of the gas in the bottle, using an analog valve. The flow rate of 5.95 g/s corresponded to the maximum constant flow rate that can be applied in order to fill the entire bottle with gas without exceeding the maximum temperature of 85° C. By following this protocol, the bottle was filled in 195 seconds and the maximum temperature reached in the bottle was 85° C.

Next, the same filling operation was carried out under different conditions by applying 3 successive flow rate ramps according to the method of the invention. An initial flow rate of 14.4 g/s was applied with a 60% per minute rate of decrease for 65 seconds, then an 8.6%/min second rate of decrease in the flow was applied for 65 seconds and finally a 1.3%/min third rate of decrease in the flow was applied until the filling was completed. The maximum temperature was rapidly reached, but maintained throughout the filling. Finally, the bottle was filled after only 175 seconds.

Figure 7:
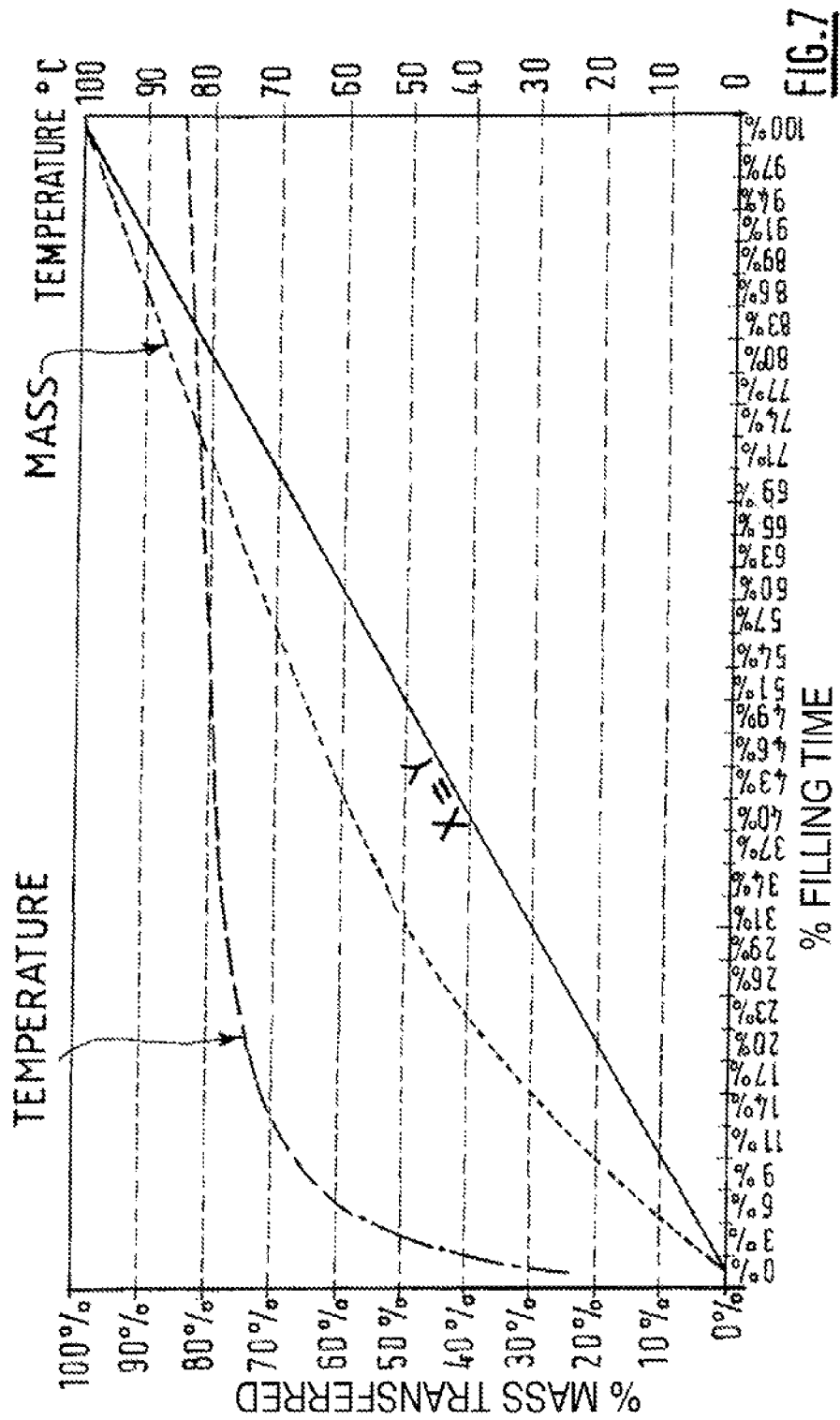

Thus, the saving in time is considerable: the gas is transferred 10% faster. FIG. 7 shows the variation in the transferred mass and the temperature during the filling for this example.

It will be understood that many additional changes in the details, materials, steps and arrangement of parts, which have been herein described in order to explain the nature of the invention, may be made by those skilled in the art within the principle and scope of the invention as expressed in the appended claims. Thus, the present invention is not intended to be limited to the specific embodiments in the examples given above.

What is claimed is:

1. A method of filling a container with gas to a pressure $P_2$ from at least one gas source at a pressure $P_1$, $P_1$ being greater than $P_2$, said container and said at least one gas source being connected via a line enabling the gas to pass from one to the other, the filling taking place at a flow rate which, at the end of filling, is lower than the initial flow rate, the method comprising several successive filling steps 1 to i, each of the steps being carried out with a filling flow rate D1 to Di for a time t1 to ti, i being an integer equal to or greater than 2, the flow rate of step i-1 being higher than the flow rate of step i, characterized in that the successive filling steps 1 to i are designed in terms of flow rate and duration so as to produce controlled heating of the container thereby maximizing the heat dissipation in said container without correspondingly increasing the temperature inside the container above the maximum temperature tolerated by the tank, the filling flow rate being adjusted according to the measured or estimated temperature of the container and the sum of the $t_i$s being between 1 and 7 minutes.

2. The filling method of claim 1, wherein i is an integer from 2 to 20.

3. The filling method of claim 1, wherein it comprises three successive filling steps, the first filling step of which with a flow rate $D_1$ for a time $t_1$, the second filling step with a flow rate $D_2$ for a time $t_2$ and the third filling step with a flow rate $D_3$ for a time $t_3$, where $D_1>D_2>D_3$, the sum of the times $t_1+t_2+t_3$ being between 1 and 7 minutes.

4. The filling method of claim 1, wherein the successive filling steps are carried out with successive decreasing flow rates, each having a different rate of decrease.

5. The filling method of claim 1, wherein the gas source and/or the container and/or the line enabling the gas to pass from one to the other are/is cooled.

6. The filling method of claim 1, wherein the rate at which said container is filled is regulated using an on/off valve placed on said line enabling the gas to pass.

7. The filling method of claim 1, wherein the rate at which said container is filled is regulated using a variable-flow regulating valve placed on said line enabling the gas to pass.

8. The filling method of claim 7, wherein the variable-flow regulating valve is controlled using a PID (proportional, integral, derivative) regulator of constant or variable action.

9. The filling method of claim 7, wherein the variable-flow regulating valve is controlled using a regulator with predictive action.

10. The filling method of claim 1, wherein the rate at which said container is filled is regulated using a set of on/off valves having different flow cross sections placed in parallel on said line enabling the gas to pass.

11. The filling method of claim 1, wherein the rate at which said container is filled is regulated using the variation in the frequency of the electrical supply for a compressor or using the variation in the frequency of the pneumatic supply for a compressor.

12. The method of claim 1, wherein the first of the successive filling steps is designed so as to achieve, without exceeding it, a gas temperature inside the container equal to the maximum value tolerated by the container.

13. The method of claim 12, wherein the filling steps after the first step are designed to keep the gas temperature inside the container equal to the maximum value tolerated by the container.

14. The method of claim 1, wherein it includes a step of calculating an optimum filling rate curve as a function of time, said optimum curve being calculated beforehand in order to obtain a minimized total filling time, as a function of: the geometry and/or thermal resistance characteristics of the tank; the ambient temperature; the pressure and temperature of the source gas; the maximum permissible wall temperature of the tank, and the maximum fill rate possible.

15. The filling method of claim 1, wherein:

said method includes a step of calculating an optimum filling rate curve as a function of time;

said optimum curve being calculated beforehand in order to obtain a minimized total filling time;

the optimum filling curve lying between two limit curves, the lower limit and the upper limit respectively, which are calculated and correspond to percentage of a total mass of the gas to be transferred relative to a percentage of the total filling time;

the lower limit curve calls for: 12% of the total mass to be transferred at 10% of the total filing time, 25% of the total mass to be transferred at 20% of the total filing time, 37.5% of the total mass to be transferred at 30% of the total filing time, 48% of the total mass to be transferred at 40% of the total filing time, 58% of the total mass to be transferred at 50% of the total filing time, 68% of the total mass to be transferred at 60% of the total filing time, 75% of the total mass to be transferred at 70% of the total filing time, 82.5% of the total mass to be transferred at 80% of the total filing time, 91% of the total mass to be transferred at 90% of the total filing time, and 100% of the total mass to be transferred at 100% of the total filing time; and the upper limit curve calls for: 35% of the total mass to be transferred at 10% of the total filing time, 48% of the total mass to be transferred at 20% of the total filing time, 58% of the total mass to be transferred at 30% of the total filing time, 67% of the total mass to be transferred at 40% of the total filing time, 75% of the total mass to be transferred at 50% of the total filing time, 83% of the total mass to be transferred at 60% of the total filing time, 88% of the total mass to be transferred at 70% of the total filing time, 92% of the total mass to be transferred at 80% of the total filing time, 96% of the total mass to be transferred at 90% of the total filing time, and 100% of the total mass to be transferred at 100% of the total filing time.

16. The filling method of claim 1, wherein the sum of the $t_i$s is between between 1 minute 30 seconds and 5 minutes.

17. The filling method of claim 1, wherein the sum of the $t_i$s is between between 2 and 4 minutes.

18. The filling method of claim 1, wherein i is an integer from 2 to 5.

* * * * *